(12) United States Patent
Thetford et al.

(10) Patent No.: US 8,524,818 B2
(45) Date of Patent: Sep. 3, 2013

(54) THERMOPLASTIC COMPOSITION

(75) Inventors: Dean Thetford, Norden (GB); Patrick J. Sunderland, Rossendale (GB)

(73) Assignee: Lubrizol Advanced Materials, Inc., Cleveland, OH (US)

(*) Notice: Subject to any disclaimer, the term of this patent is extended or adjusted under 35 U.S.C. 154(b) by 311 days.

(21) Appl. No.: 12/863,218

(22) PCT Filed: Jan. 14, 2009

(86) PCT No.: PCT/US2009/030920
§ 371 (c)(1),
(2), (4) Date: Jul. 16, 2010

(87) PCT Pub. No.: WO2009/091774
PCT Pub. Date: Jul. 23, 2009

(65) Prior Publication Data
US 2011/0041730 A1 Feb. 24, 2011

Related U.S. Application Data

(60) Provisional application No. 61/021,997, filed on Jan. 18, 2008.

(51) Int. Cl.
*C08G 18/28* (2006.01)
*C08K 5/16* (2006.01)

(52) U.S. Cl.
USPC ............ 524/198; 524/86; 524/105; 524/185; 106/272; 106/400; 548/520

(58) Field of Classification Search
USPC ................ 524/86, 105, 185, 198; 106/400, 106/272; 548/520
See application file for complete search history.

(56) References Cited

U.S. PATENT DOCUMENTS 7,947,777 B2 * 5/2011 Haubennestel et al. ...... 524/539

FOREIGN PATENT DOCUMENTS

| JP | 54117547 A | | 9/1979 |
| JP | 3269050 A | | 11/1991 |
| JP | 2001137436 A | | 5/2001 |
| WO | WO2005/097872 | * | 10/2005 |
| WO | WO 2009/018413 | * | 2/2009 |

* cited by examiner

*Primary Examiner* — James J Seidleck
*Assistant Examiner* — Deve E Valdez
(74) *Attorney, Agent, or Firm* — Michael F. Esposito; Samuel B. Laferty

(57) ABSTRACT

The invention relates to a composition containing a particulate solid, a plastic material (such as a thermoplastic polymer) and a compound containing an amide group. The compound is capable of being a dispersant. The invention further relates to novel compounds, and the use of the compound as a dispersant.

15 Claims, No Drawings

THERMOPLASTIC COMPOSITION

CROSS REFERENCE TO RELATED APPLICATION

This application claims priority from PCT Application Serial No. PCT/US2009/30920 filed on Jan. 14, 2009, which claims the benefit of U.S. Provisional Application No. 61/021,997 filed on Jan. 18, 2008.

FIELD OF INVENTION

The invention relates to a composition containing a particulate solid, a plastic material (such as a thermoplastic polymer) and a compound containing an amide group. The compound is capable of being a dispersant.

BACKGROUND OF THE INVENTION

Thermoplastics such as PP, PE, etc., are typically coloured using pigment concentrates. The pigment concentrates are often referred to as masterbatches or compounds. These concentrates are prepared by mixing ingredients together and subjecting them to any of the processes commonly used for dispersing particulate solids in a thermoplastic polymer. Compounding or mixing in a twin-screw extruder is one of these processes. Pigment concentrations in masterbatches may contain up to 70% of pigment, and optionally other additives. Other additives may include waxes, dispersants, lubricants and UV stabilizers.

Production of masterbatches typically utilises a pigment dispersed in thermoplastic polymer, i.e., fine particles with limited amounts of aggregates. However, aggregates are known to form from the pigments in the production of masterbatches. The presence of aggregates tends to result in filter blocking of the extruder.

In addition, particular requirements are important for finished articles containing the thermoplastic polymer. The thermoplastic polymer may be in the form of a solid article, a film or fiber. In solid articles, acceptable dispersion of the pigment is necessary in order to maximise colour development, tinctorial strength and reduced speck levels. For films, incomplete dispersion of the pigment may lead to cracking, unwanted light scattering effects and specks. In fibres, incomplete dispersion of the pigment may result in fiber breakage.

U.S. Pat. No. 4,797,400 discloses the use of a polymer containing a carboxylate functionality, e.g., poly(12-hydroxystearic acid) or polyricinoleic acid, as a dispersant in the presence of a particulate solid, a lubricant and a thermoplastic polymer.

Waxes are also known to disperse particulate solids in thermoplastic polymers, see U.S. Patent Application 2002/0151639.

SUMMARY OF THE INVENTION

The composition described herein is able to minimise at least one of any of the technical challenges discussed above. These challenges may lead to less efficient processing in expensive extruder-type equipment, causing production costs to increase. The present invention therefore identifies compounds and compositions thereof capable of dispersing a pigment allowing a thermoplastic to have at least one of (i) a reduction in aggregates and specks, (ii) provides a finer state of dispersion (for example having a lower filter pressure value), (iii) has acceptable tinctorial strength, and has improved brightness, and (iv) faster rates of dispersion.

In one embodiment, the invention provides a composition comprising a particulate solid, a plastic material (such as a thermoplastic polymer) and compound, wherein the compound is represented by Formula (1):

$$T\text{-}G\text{-}Z$$

wherein:
T is a lipophilic component of an alk(en)yl group containing 6 or more carbon atoms, a polyester, or mixtures thereof;
G is an acylating group (including an acyl group or polyacyl groups), typically containing one or two carbonyl groups;
Z is $-N(R)_j$ or $-N(R)_v(B\text{-}D)\text{-}$, bonded to a carbonyl group of G to form either an amide or imide group;
j is 1 or 2, R is independently H or a $C_{1-18}$ alk(en)yl group with the proviso when j is 2 each R group can be the same or different;
v is 0 or 1, with the proviso that when v is 1, R is independently H or a $C_{1-18}$ alk(en)yl group, and when v is 0 nitrogen forms an imide group;
B is an alkylene radical, a hydroxyalkylene radical, a nitrogen-containing alkylene radical, a nitrogen-containing hydroxyalkylene radical, or mixtures thereof, typically containing 2-12, or 2 to 10 carbon atoms; and
D is a primary or secondary amino group on which is attached one or more T-CO— groups.

When B is a nitrogen-containing alkylene radical, or a nitrogen-containing hydroxyalkylene radical, the radical may contain 2 to 7, or 2 to 6 nitrogen atoms.

In one embodiment, the invention provides a compound of Formula (1a):

$$T\text{-}G\text{-}N(R)_v\text{---}B\text{---}N(R)_v\text{-}G\text{-}T$$

wherein
T is a lipophilic component of an alk(en)yl group containing 6 or more carbon atoms, a polyester, or mixtures thereof;
N is nitrogen;
G is an acylating group containing two carbonyl groups, typically derived from a succinic acid or anhydride;
B is an alkylene radical, a hydroxyalkylene radical, a nitrogen-containing alkylene radical, a nitrogen-containing hydroxyalkylene radical, or mixtures thereof, typically containing 2-12, or 2 to 10 carbon atoms; and
v is 0 or 1, with the proviso that when v is 1 R is independently H or $C_{1-18}$ alk(en)yl group, and when v is 0 nitrogen forms an imide group.

The compound of Formula (1a) may also be represented by:

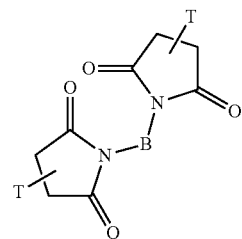

wherein B and T are defined above.

In one embodiment, the invention provides for the use of the compound of Formula (1) and/or Formula (1a) as a dispersant.

In one embodiment, the invention provides for the use of the compound defined above as a dispersant in the composition disclosed herein.

In one embodiment, the invention provides a composition suitable for dispersing a particulate solid in a thermoplastic medium. The composition may be suitable for manufacture of films, fibres and solid articles.

DETAILED DESCRIPTION OF THE INVENTION

The present invention provides a composition as disclosed herein above.

As used herein the term "alk(en)yl" encompasses both alkyl and alkenyl groups.

Compounds of Formulae (1) and/or (1a) may be defined in such a way that each variable may be represented by one or more of the possible variants as defined herein.

In one embodiment, T may contain at least 6 or at least 10 carbon atoms. The upper limit on the number of carbon atoms for T may be 300, 400 or 500. In one embodiment, T may have a number average molecular weight of less than 1750, or up to 1500, or up to 1200. Examples of a suitable number average molecular weight include 300 to 1500, or 400 to 1000.

In one embodiment, the compound of Formula (1) wherein the T group may be a $C_{6\text{-}500}$, or $C_{10\text{-}400}$, or $C_{10\text{-}300}$ alk(en)yl group.

The $C_{40\text{-}500}$ alk(en)yl group typically includes polyisobutenyl groups. The alk(en)yl group (such as a polyisobutenyl group) may have a number average molecular weight of 450 to 5000, or 450 to 2500, or 500 to 1000. In different embodiments, the alk(en)yl groups' number average molecular weight may be 900-1000, or 2200-2300. In one embodiment, the alk(en)yl group (such as a polyisobutenyl group) has a number average molecular weight of 900-1000.

In one embodiment, the T-CO— group of Formula (1) may be derived from an alkenyl-substituted acylating agent that may contain 8 to 100, or 10 to 70, or 12 to 50 carbon atoms. Examples of alkenyl-substituted acylating agent may include dodecyl succinic anhydride, hexadecyl succinic anhydride, octadecyl succinic anhydride, dodecenyl succinic anhydride, hexadecenyl succinic anhydride, octadecenyl succinic anhydride, or polyisobutylene succinic anhydride.

In one embodiment, the T-CO— group of Formula (1) may also be derived from fatty acids having 6 to 50, or 8 to 36 carbon atoms. Examples of suitable fatty acids include myristic acid, oleic acid, palmitic acid, erucic acid, behenic acid, Versatic™ acid 911 (may also be described as a $C_{9\text{-}11}$-branched fatty acid), Versatic™ acid 10 (may also be described as tert-decanoic acid), ricinoleic acid, 12-hydroxystearic, 9,11-linoleic acid 9,12-linoleic acid, 9,12,15-linolenic acid, abietic acid, hexanoic acid, octanoic acid, lauric acid, decanoic acid, stearic acid, 2-ethylbutyric acid, 2-ethylhexanoic acid, 2-butyloctanoic acid, 2-hexyldecanoic acid, 2-octyldodecanoic acid and 2-decyltetradecanoic acid. Branched alkyl carboxylic acids of this type are available under the trade mark Isocarb® (ex Sasol GmbH) and specific examples are Isocarb® 12, 16, 20, 28, 32, 34T and 36. Many of the carboxylic acids are available commercially as mixtures. Other examples of fatty acids include mixtures of fatty acids derived from oils from naturally occurring sources such as sunflower oil, olive oil, rapeseed oil, castor oil, palm oil, coconut oil, linseed oil, soya bean oil, fish oil and the like, in either a hydrogenated (saturated) or unsaturated form. Further examples of fatty acids include the Unicid® acids (linear primary synthetic carboxylic acids) commercially available from Baker Petrolite Polymer Division.

In one embodiment, the compound may also be derived from a hydroxy carboxylic acid, or derivatives thereof.

In one embodiment, suitable examples of hydroxy carboxylic acids include ricinoleic acid, 12-hydroxystearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undecanoic acid, or mixtures thereof. Specific examples of suitable lactones include caprolactone, valerolactone and alkyl substituted caprolactones such as 7-methyl caprolactone.

In one embodiment, T is a polyester (may also be referred to as a polyhydroxy acid). The polyester may be derived from the hydroxy-containing fatty acids listed above.

In one embodiment, the polyester may be made from a mixture of caprolactone and hydroxy-containing fatty acid. Typically, such a mixture may contain ricinoleic acid, 12-hydroxystearic acid, or mixtures thereof.

In Formula (1), examples of the radicals represented by B include ethylene, propylene, tetramethylene, hexamethylene, dodecamethylene and 2-hydroxytrimethylene.

Examples of suitable amines represented by —N(B-D)— include ethylenediamine, 1,2-propylene diamine, 1,3-propylene diamine, 1,4-butylene diamine, 1,6-hexylene diamine, 1,8-octylene diamine, 1,10-decylene diamine, 1,12-dodecylene diamine, the isomeric butylenediamines, pentanediamines, hexanediamines, heptanediamines, diethylenetriamine, dipropylenetriamine, dibutylenetriamine, triethylenetetramine, tetraethylenepentamine, pentaethylenehexamine, hexamethylenetetramine, and bis(hexamethylene) triamine, the diaminobenzenes, the diaminopyridines or mixtures thereof.

INDUSTRIAL APPLICATION

In one embodiment, the compound as described herein is a processing aid or dispersant.

The compound in different embodiments may be present in the composition of the invention in a range selected from 0.1 to 50 wt. %, or 0.25 to 35 wt. %, and 0.5 to 30 wt. %.

The particulate solid present in the composition may be any inorganic or organic solid material. In one embodiment, the particulate solid is a pigment.

In one embodiment, the particulate solid is an organic pigment from any of the recognised classes of pigments described, for example, in the Third Edition of the Colour Index (1971) and subsequent revisions of, and supplements thereto, under the chapter headed "Pigments".

Examples of organic pigments are those from the azo, disazo, trisazo, condensed azo, azo lakes, naphthol pigments, anthrapyrimidine, benzimidazolone, carbazole, diketopyrrolopyrrole, flavanthrone, indigoid pigments, isoindolinone, isoindoline, isoviolanthrone, metal complex pigments, oxazine, perylene, perinone, pyranthrone, pyrazoloquinazolone, quinophthalone, triarylcarbonium pigments, triphendioxazine, xanthene, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes, and carbon black. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones, diketopyrrolopyrroles, perylenes and carbon black.

Inorganic solids include: extenders and fillers such as talc, kaolin, montmorillonites including bentonites, hectorites and saponites, mica, silica, barytes and chalk, flame-retardant fillers such as alumina trihydrate, natural magnesium hydroxide; or brucite, particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium, ferrites; and metal particles, especially metallic iron, nickel, cobalt, copper and alloys thereof.

Examples of other inorganic pigments include metallic oxides such as titanium dioxide, rutile titanium dioxide and surface coated titanium dioxide, titanium oxides of different colours such as yellow and black, iron oxides of different colours such as yellow, red, brown and black, zinc oxide, zirconium oxides, aluminium oxide, oxymetallic compounds such as bismuth vanadate, cobalt aluminate, cobalt stannate, cobalt zincate, zinc chromate and mixed metal oxides of manganese, nickel, titanium, chromium, antimony, magnesium, cobalt, iron and aluminium, Prussian blue, vermillion, ultramarine, zinc phosphate, zinc sulphide, molybdates and chromates of calcium and zinc, metal effect pigments such as aluminium flake, copper, and copper/zinc alloy, pearlescent flake such as lead carbonate and bismuth oxychloride.

In one embodiment, thermoplastic resins include polyolefins, polyesters, polyamides, polycarbonates, polyurethanes, polystyrenics, poly(meth)acrylates, celluloses and cellulose derivatives. Said compositions may be prepared in a number of ways but melt mixing and dry solid blending are typical methods.

Examples of a suitable thermoplastics include (low density, or linear low density or high density) polyethylene, polypropylene, polystyrene, polyethylene terephthalate (PET), polybutylene terephthalate (PBT), nylon 6, nylon 6-6, nylon 6-12, nylon 11, nylon 12, nylon 4-6, polymethylmethacrylate, polyethersulphone, polysulphone, polycarbonate, polyvinyl chloride (PVC), chlorinated polyvinyl chloride, thermoplastic polyurethane, ethylene vinyl acetate (EVA), Victrex PEEK™ polymers (such as oxy-1, 4-phenyleneoxy-1, 4-phenylene-carbonyl-1, 4-phenylene polymers) and acrylonitrile butadiene styrene polymers (ABS); and various other polymeric blends or alloys.

The compositions typically contain from 1 to 95% by weight of the particulate solid, the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition may include other ingredients such as antifogging agents, nucleators, blowing agents, flame retardants, process aids, surfactants, heat stabilizers, UV absorbers, fragrances, anti-microbial agents, biocides, impact modifiers, antioxidants, antistatic agents, coupling agents, foaming agents, mould-release agents, lubricants (external and internal), plasticisers, slip agents, UV stabilisers, viscosity depressants, dispersants other than the compound of the present invention, and air-release agents.

The composition may be prepared by any of the conventional methods known for preparing thermoplastic compounds. Thus, the solid, the thermoplastic polymer, and the dispersant may be mixed in any order, the mixture then being subjected to a mechanical treatment to reduce the particles of the solid to an appropriate size, for example, by Banbury mixing, ribbon blending, twin-screw extrusion, twin-roll milling, compounding in a Buss co-kneader, or similar equipment.

In one embodiment, the composition of the invention further includes one or more additional known dispersants.

In one embodiment, the invention provides a composition comprising:
(a) 0.1 to 50 wt. %, or 0.25 to 35 wt. %, and 0.5 to 30 wt. % of the compound disclosed above;
(b) 0 to 90 wt. % of an amorphous poly-α-olefin, such as a polyethylene/polypropylene mixture;
(c) 0 to 90 wt. % of a wax, typically a polyolefin wax, such as a polyethylene wax;
(d) 0 to 30 wt. % of a crystalline polyolefin; and
(e) 0 to 75 wt. % of a hydrogenated castor oil wax.

In one embodiment, the invention provides a composition comprising:
(a) 0.1 to 50 wt. %, or 0.25 to 35 wt. %, and 0.5 to 30 wt. % of the compound disclosed above;
(b) 0 to 90 wt. % of an amorphous poly-α-olefin such as a polyethylene/polypropylene mixture;
(c) 0 to 90 wt. % of a wax, typically a polyolefin wax such as a polyethylene wax; and
(d) 0 to 30 wt. % of a crystalline polyolefin, and
(e) 0 to 75 wt. % of a hydrogenated castor oil wax,
with the proviso that at least one of (b) and (c) is present at 0.1 wt % or more.

The polyolefin wax (such as a polyethylene wax) may be described as a carrier, co-agent or synergist.

In one embodiment, the invention provides for a micronised composition as is described herein. In one embodiment, the composition further comprising at least one of either (i) an amorphous poly-α-olefin, or (ii) polyolefin wax, has a particle size fraction of at least 10 wt % having a diameter of 1 mm or less, or 0.5 mm or less, or 0.1 mm or less, or 0.05 mm or less. In one embodiment, the particle size fraction may be 50 nm to 1 mm, or 100 nm to 0.05 mm.

Another inventive use of the compound of Formula (1) consists in the production of dispersible solids in powder particle and/or fibre particle form, particularly of dispersible pigments or polymeric fillers, where the particles are coated with the dispersant. Coatings of this kind, of both organic and inorganic solids, are carried out in a known way, as described for example in EP-A-0 270 126. In this case a solvent or emulsion medium may either be removed or remain in the mixture, forming pastes. These pastes are customary commercial products and may further comprise binder fractions and also further auxiliaries and additives. In the case of pigments it is possible to coat the pigment surface during or after the synthesis of the pigments, by, for example, adding the compound of Formula (1) of the invention to the pigment suspension, or during or after the operation of pigment finish. The pigments pretreated in this way are notable for greater ease of incorporation and also for enhanced viscosity, flocculation and gloss performance and for higher colour strength, as compared with untreated pigments.

The composition comprising the compound of Formula (1) and the plastic material may be formulated with the particulate solid in a similar manner to that described hereinbefore for the compound of Formula (1), and the plastic material. This composition may then be treated as a "master batch" and added to additional polymeric material when forming fabricated articles. The amount of "master batch" which is mixed with the additional polymeric material may vary over wide limits depending on the nature of polymeric material and the particulate solid. In different embodiments, the amount of "master batch" ranges include 0.5 to 50%, or 10 to 50%, or 20 to 50% based on the total weight of the final plastic article (typically thermoplastic). Although the plastic material used in preparing the "master batch" may differ from the addition of further plastic material, but typically it may be the same. The use of "master batches" is especially useful where the plastic material includes polypropylene, polyethylene, polyethylene/polypropylene diene, ethyl vinyl acetate, polychloroprene, chlorinated polyethylene, chlorosulphonated polyethylene, poly vinyl chloride, natural and synthetic rubber such as butadiene-based elastomers (for instance butadiene-styrene, butadiene-acrylonitrile rubbers, polybutadiene), polyisoprene or natural rubber.

The following examples provide illustrations of the invention. These examples are non exhaustive and are not intended to limit the scope of the invention.

EXAMPLES

Melt 1 (MELT1): Ethylene-bis-stearamide (37 parts) (commercially from Aldrich) is melt mixed with polypropylene (20 parts, ex Aldrich weight average molecular weight (MW) 14,000) and polyethylene (43 parts, ex Aldrich, medium density).

Example 1 (EX1): Polyisobutylene succinic anhydride (with polyisobutylene having a number average molecular weight of 950) 148.2 g is charged to a 250 ml 3 neck round bottom flask and stirred at 70° C. under a nitrogen atmosphere. Ethylene diamine (4.45 g) is added slowly dropwise to the stirred liquid. An exotherm resulted and the temperature is allowed to cool back to 70° C. and held at this temperature for 3 hours. The temperature is then raised to 180° C. for 24 hours and a brown viscous liquid (135.2 g) is obtained with an acid value of 10.5 mg KOH/g.

Melt 2 (MELT2): The product of EX1 (37 parts) is melt mixed with polypropylene (20 parts, ex Aldrich weight average molecular weight (MW) 14,000) and polyethylene (43 parts, ex Aldrich, medium density).

Example 2 (EX2): Example 2 employs the same procedure as Example 1, except ethylene diamine (12.59 g) is used and polyisobutylene succinic anhydride is replaced with Pentasize 68 (ex Pentagon) (144.95 g) (a mixture of 1:1 weight ratio of hexadecenyl succinic anhydride and octadecenyl succinic anhydride. A viscous brown liquid is obtained (136.6 g) with an acid value of 17.5 mg KOH/g.

Melt 3 (MELT3): The product of EX2 (37 parts) is melt mixed with polypropylene (20 parts, ex Aldrich weight average molecular weight (MW) 14,000) and polyethylene (43 parts, ex Aldrich, medium density).

Example 3 (EX3): Polyhydroxystearic acid with an acid value of 76.5 mg KOH/g (94.8 g) (prepared as in Example B of U.S. Pat. No. 3,778,287) is charged to a 250 ml 3 neck round bottom flask and stirred at 120° C. under a nitrogen atmosphere. Hexamethylene diamine (11.28 g) is added to the stirred liquid and zirconium butoxide (0.3 g) is added. The temperature is raised to 180° C. for 20 hours and a brown solid (92.1 g) is obtained upon cooling with an acid value of 4.6 mg KOH/g.

Melt 4 (MELT4): The product of EX3 (37 parts) is melt mixed with polypropylene (20 parts, ex Aldrich weight average molecular weight (MW) 14,000) and polyethylene (43 parts, ex Aldrich, medium density).

Example 4 (EX4): Polyhydroxystearic acid with an acid value of 76.5 mg KOH/g (95.6 g) (prepared as in Example B of U.S. Pat. No. 3,778,287) is charged to a 250 ml 3 neck round bottom flask and stirred at 120° C. under a nitrogen atmosphere. Diethylene triamine (6.74 g) is added to the stirred liquid and then zirconium butoxide (0.3 g). The temperature is raised to 180° C. for 20 hours and a brown gum (90.6 g) is obtained with an acid value of 5.8 mg KOH/g.

Melt 5 (MELT5): The product of EX4 (37 parts) is melt mixed with polypropylene (20 parts, ex Aldrich weight average molecular weight (MW) 14,000) and polyethylene (43 parts, ex Aldrich, medium density).

Example 5 (EX5): Polyhydroxystearic acid with an acid value of 37 mg KOH/g (97.4 g) (prepared as in Example A of U.S. Pat. No. 3,778,287) is charged to a 250 ml 3 neck round bottom flask and stirred at 120° C. under a nitrogen atmosphere. Hexamethylene diamine (5.62 g) is added to the stirred liquid and then zirconium butoxide (0.3 g). The temperature is raised to 180° C. for 24 hours and a brown solid (91.3 g) is obtained upon cooling with an acid value of 2.3 mg KOH/g.

Melt 6 (MELT6): The product of EX5 (37 parts) is melt mixed with polypropylene (20 parts, ex Aldrich weight average molecular weight (MW) 14,000) and polyethylene (43 parts, ex Aldrich, medium density).

Example 6 (EX6): Lauric acid (83.3 g) is charged to a 250 ml 3 neck round bottom flask and stirred at 120° C. under a nitrogen atmosphere. Hexamethylene diamine (36.23 g) is added to the stirred liquid and then zirconium butoxide (0.3 g). The temperature is raised to 180° C. for 24 hours and a buff solid (92.1 g) is obtained upon cooling.

Melt 7 (MELT7): The product of EX6 (37 parts) is melt mixed with polypropylene (20 parts, ex Aldrich weight average molecular weight (MW) 14,000) and polyethylene (43 parts, ex Aldrich, medium density), Example 7 (EX7): Polyisobutylene succinic anhydride (with a polyisobutylene having a number average molecular weight of 950) 192.3 g is charged to a 500 ml 3 neck round bottom flask after being preheated to 70° C. Hexamethylene diamine (11.17 g) is preheated to 50° C. and added to the reaction vessel. The vessel contents are heated to 90° C. and held at this temperature for 3 hours with constant overhead stirring and nitrogen atmosphere. The temperature is raised to 180° C. and held for 14 hours. A brown viscous liquid (190.3 g) is obtained with IR spectra indicating imide peaks at 1775 $cm^{-1}$ and 1702 $cm^{-1}$.

Melt 8 (MELT8): The product of EX7 (90 parts) is melt mixed with hydrogenated castor oil wax (167 parts).

Example 8 (EX8): Pentasize™ 68 (ex Pentagon) (179.23 g) (a mixture of 1:1 weight ratio hexadecenyl succinic anhydride and octadecenyl succinic anhydride) and hexamethylene diamine (30.1 g) (preheated to 50° C.) are charged to a 500 ml 3 neck round bottom flask and the contents are heated to 70° C. with overhead stirring and a nitrogen atmosphere. After 2.5 hours the reaction temperature is increased to 180° C. and held for 21 hours. A brown viscous liquid is obtained (193.7 g). IR analysis indicates a peak at 1774 $cm^{-1}$.

Melt 9 (MELT9): The product of EX8 (90 parts) is melt mixed with hydrogenated castor oil wax (167 parts).

Example 9 (EX9): Behenic acid (178.94 g) and hexamethylene diamine (30.53 g) (preheated to 50° C.) are charged to a 500 ml 3 neck round bottom flask and the contents are heated to 140° C. with overhead stirring and a nitrogen atmosphere (step (a)). Zirconium IV butoxide (~80% in tert-butanol) (0.6 g) is added and the reaction temperature is increased to 180° C. and held for 5 hours (step (b)). A hard off-white solid (180 g) is obtained. IR analysis indicates amide peaks at 1644 $cm^{-1}$, 1634 $cm^{-1}$ and an amide N—H stretch at 3312 $cm^{-1}$.

Examples 10-21 (EX10 to EX21) are prepared in a similar process as Example 9, except the reaction times, reagents and reagent quantities are varied as is shown in the table below. The table also indicates the amount of product isolated by the reaction.

| Example | Fatty Acid | Amount of Fatty Acid (g) | Diamine | Amount of Diamine (g) | Step (b) Reaction Time (hrs) | Amount of Product Obtained (g) |
|---|---|---|---|---|---|---|
| EX10 | Stearic | 175.3 | hexamethylene | 512.0 | 43 | 180 |
| EX 11 | Lauric | 166.7 | hexamethylene | 69.1 | 24 | 183 |
| EX 12 | Lauric | 141.8 | 1,12-dodecane | 70.9 | 21 | 186 |
| EX 13 | Lauric | 177.0 | 1,4-butane | 38.9 | 6 | 183 |
| EX 14 | Behenic | 162.6 | 1,4-butane | 21.0 | 6 | 180 |
| EX 15 | Behenic | 141.0 | 1,12-dodecane | 41.5 | 6 | 163 |
| EX 16 | Erucic | 134.2 | hexamethylene | 23.0 | 5 | 140 |
| EX 17 | Oleic | 131.4 | hexamethylene | 27.0 | 5 | 139 |
| EX 18 | Unicid ™ 350 acid | 90.7 | hexamethylene | 13.5 | 6 | 94 |
| EX 19 | HRA | 154.8 | hexamethylene | 29.3 | 5 | 165 |
| EX 20 | Behenic | 182.0 | DETA | 25.6 | 22 | 185 |
| EX 21 | Behenic | 190.8 | DETA | 19.3 | 22 | 188 |

Footnote:
HRA is hydrogenated rapeseed oil fatty acid (commercially available Oleon)
Unicid ™ 350 acid is commercially available from Baker Petrolite
DETA is diethylene triamine Dispersant Evaluation Test 1: 60 parts of each melt and example are charged into a Henschel mixer with Heuco Green 600703K (Pigment Green 7, 200 parts) and LDPE pellets (Exxon Mobil LD600 240 parts). The materials are blended together for 60 seconds to form a premix. This premix is compounded through a Thermo Prism TSE16TC twin screw extruder, with a screen pack profile of 400/60 mesh. The temperature profile for the extruder zones is 60/130/140/160/160 from feeder to die. The pressure in bar behind the screen pack is recorded digitally. The pressure data, taken at 100 second intervals, is presented in the table below. The letters OP in the table indicate that the pressure behind the screen pack is greater than 100 bar, the over-pressure limit of the extruder.

| | Filter Pack Pressure in Bar | | | | | | | | | |
|---|---|---|---|---|---|---|---|---|---|---|
| Example | 100 s | 200 s | 300 s | 400 s | 500 s | 600 s | 700 s | 800 s | 900 s | 1000 s |
| Control 1 | 82 | 92 | OP | OP | OP | OP | OP | OP | OP | OP |
| Control 2 | 32 | 43 | 49 | 59 | 68 | 83 | OP | OP | OP | OP |
| MELT1 | 21 | 23 | 24 | 25 | 27 | 29 | 29 | 30 | 33 | 34 |
| MELT2 | 25 | 32 | 35 | 40 | 44 | 50 | 55 | 62 | N.M | N.M |
| MELT3 | 29 | 32 | 35 | 37 | 41 | 45 | 51 | 58 | N.M | N.M |
| MELT4 | 23 | 26 | 29 | 33 | 37 | 43 | 50 | 59 | N.M | N.M |
| MELT5 | 23 | 27 | 30 | 34 | 38 | 43 | 50 | 56 | 64 | N.M |
| MELT6 | 23 | 28 | 32 | 37 | 43 | 51 | 63 | 72 | 89 | N.M |
| MELT7 | 12 | 16 | 23 | 30 | 40 | 52 | 63 | 77 | N.M | N.M |
| MELT8 | 17 | 32 | 38 | 45 | 51 | 57 | 66 | 80 | N.M | N.M |
| MELT9 | 11 | 19 | 25 | 31 | 36 | 45 | 56 | 65 | N.M | N.M |
| EX 9 | 9 | 12 | 14 | 18 | 22 | 27 | 35 | 44 | N.M | N.M |
| EX 10 | 7 | 10 | 12 | 14 | 18 | 21 | 27 | 31 | N.M | N.M |
| EX 11 | 9 | 12 | 14 | 16 | 19 | 22 | 25 | 30 | N.M | N.M |
| EX 12 | 10 | 13 | 16 | 21 | 23 | 29 | 33 | 40 | N.M | N.M |
| EX 13 | 8 | 10 | 12 | 14 | 16 | 19 | 23 | 27 | 32 | N.M |
| EX 14 | 9 | 12 | 14 | 18 | 23 | 28 | 35 | 41 | N.M | N.M |
| EX 15 | 4 | 8 | 9 | 11 | 13 | 15 | 19 | 23 | N.M | N.M |
| EX 16 | 5 | 8 | 10 | 11 | 13 | 15 | 19 | N.M | N.M | N.M |
| EX 17 | 7 | 11 | 14 | 18 | 25 | 27 | 33 | 40 | N.M | N.M |
| EX 18 | 10 | 12 | 14 | 19 | 23 | 28 | 34 | 40 | N.M | N.M |
| EX 19 | 6 | 10 | 13 | 16 | 20 | 25 | 31 | 37 | N.M | N.M |
| EX 20 | 5 | 6 | 9 | 12 | 15 | 19 | 22 | 26 | N.M | N.M |
| EX 21 | 34 | 48 | 52 | 52 | 52 | 46 | 46 | 45 | N.M | N.M |

Footnote to Table:
Control 1 is a thermoplastic containing no dispersant.
Control 2 is a thermoplastic containing polyethylene wax AC-16a commercially available from Honeywell.
N.M indicates a data point not measured.
s is the number of seconds.

Dispersant Evaluation Test 2: The melt is prepared in a similar way as shown in Test 1. Then the coloured masterbatch (2 parts) is letdown with a white masterbatch (13.33 parts) (Plaswite PE7024 ex Cabot) containing 60% titanium dioxide and more letdown HDPE polymer (384.67 parts) (ex Borealis MG9641) using a Betol single screw extruder. The extruded pellets were collected and then injection moulded on a Boy 15S Injection Moulder into 50×35 mm plaques. The changes in colour strength of the plaques for each example versus the control are measured using the Spectroflash 600 spectrophotometer. The results obtained are:

|  | Treat Rate (wt %) | Colour Strength (%) |
|---|---|---|
| Control 1 | 0 | 95.08 |
| Control 2 | 20 | 100.35 |
| Control 3 | 12 | 100 |
| MELT1 | 12 | 104.78 |
| MELT2 | 12 | 101.83 |
| MELT3 | 12 | 106.82 |
| MELT4 | 12 | 106.66 |
| MELT5 | 12 | 102.82 |
| MELT6 | 12 | 100.86 |
| MELT7 | 12 | 111.02 |

Footnote:
Control 1 and 2 are the same as described above.
Control 3 is a thermoplastic containing additive 2 dispersant from U.S. Pat. No. 4,797,400.

Dispersant Evaluation Test 3: The melt is prepared in a similar way as shown in Test 1. Then the coloured masterbatch (0.5 parts) is letdown with a white masterbatch (3.33 parts) (Plaswite PE7024 ex Cabot) containing 60% titanium dioxide, and more letdown LDPE pellets (Exxon Mobil LD600) (96.17 parts) using Servite Polymix 110 L two roll mill (front roll 1.15° C., back roll 85° C.). A sample of the let down is pressed into a 64×38×1 mm plaque. The changes in colour strength of the plaques for each example versus the control are measured using the Spectroflash 600 spectrophotometer. The results obtained are:

|  | Treat Rate (wt %) | Colour Strength (%) |
|---|---|---|
| Control 1 | 0 | 91.65 |
| Control 3 | 12 | 100.00 |
| MELT8 | 12 | 126.35 |
| MELT9 | 12 | 119.84 |
| EX9 | 12 | 114.59 |
| EX10 | 12 | 112.06 |
| EX11 | 12 | 116.06 |
| EX12 | 12 | 122.19 |
| EX13 | 12 | 122.31 |
| EX14 | 12 | 113.04 |
| EX15 | 12 | 114.17 |
| EX16 | 12 | 114.60 |
| EX17 | 12 | 112.41 |
| EX18 | 12 | 115.07 |
| EX19 | 12 | 114.99 |
| EX20 | 12 | 111.61 |
| EX21 | 12 | 112.55 |

Overall, the data obtained from the tests indicates that the compositions of the invention have acceptable performance after more than one thousand seconds. Accordingly, the composition of the present invention is capable of dispersing a pigment that also allows for a thermoplastic to have at least one of a reduction in aggregates and specks, provides a finer state of dispersion (for example, having a lower filter pressure value), has acceptable tinctorial strength, and has acceptable brightness and faster rates of dispersion.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising a particulate solid, a plastic material and a compound, wherein the compound represented by Formula (1):

T-G-Z wherein:
T is a lipophilic component of an alk(en)yl group containing 6 or more carbon atoms, a polyester, or mixtures thereof;
G is an acylating group;
Z is $-N(R)_j$ or $-N(R)_v(B-D)-$, bonded to a carbonyl group of G to form either an amide or imide group;
j is 1 or 2, R is independently H or a $C_{1-18}$ alk(en)yl group with the proviso when j is 2 each R group can be the same or different;
v is 0 or 1, with the proviso that when v is 1, R is independently H or a $C_{1-18}$ alk(en)yl group, and when v is 0 nitrogen forms an imide group;
B is an alkylene radical, a hydroxyalkylene radical, a nitrogen-containing alkylene radical, a nitrogen-containing hydroxyalkylene radical, or mixtures thereof; and
D is a primary or secondary amino group on which is attached one or more T-CO— groups.

2. The composition of claim 1, wherein the plastic material is a thermoplastic polymer.

3. The composition of claim 2, wherein the thermoplastic polymer is a thermoplastic resin.

4. The composition of claim 1, wherein the particulate solid is a pigment.

5. The composition of claim 1, wherein the particulate solid is present at 1 to 95% by weight of the composition.

6. The composition of claim 4, wherein the compound is present at a range selected from 0.25 to 35 wt. % of the composition.

7. The composition of claim 1 as a dispersant in a composition further comprising a particulate solid and a plastic material.

8. The composition of claim 1, wherein:
(a) the compound of Formula (1) is present at 0.1 to 50 wt. % of the composition;

(b) the plastic material is either:
(i) 0 to 90 wt % of an amorphous poly-α-olefin;
(ii) 0 to 90 wt % of a wax;
(iii) 0 to 30 wt % of a crystalline polyolefin, or
(iv) 0 to 75 wt % of a hydrogenated castor oil wax,
with the proviso that at least one of (i) and (ii) is present at 0.1 wt % or more.

9. The composition of claim 8, wherein the amorphous poly-α-olefin is a polyethylene/polypropylene mixture.

10. A compound of Formula (1a):

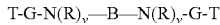

wherein
T is a lipophilic component of an alk(en)yl group containing 6 or more carbon atoms, a polyester, or mixtures thereof;
N is nitrogen;
G is an acylating group containing two carbonyl groups;
B is an alkylene radical, a hydroxyalkylene radical, a nitrogen-containing alkylene radical, a nitrogen-containing hydroxyalkylene radical, or mixtures thereof; and
v is 0 or 1, with the proviso that when v is 1 R is independently H or a $C_{1-18}$ alk(en)yl group, and when v is 0 nitrogen forms an imide group.

11. The compound of claim 10, wherein formula (1a) is represented by:

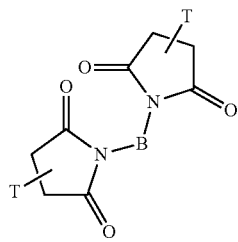

wherein
T is a lipophilic component of an alk(en)yl group containing 6 or more carbon atoms, a polyester, or mixtures thereof; and
B is an alkylene radical, a hydroxyalkylene radical, a nitrogen-containing alkylene radical, a nitrogen-containing hydroxyalkylene radical, or mixtures thereof.

12. The composition of claim 10, wherein the alk(en)yl group has a number average molecular weight of 900-1000.

13. The composition of claim 10, wherein T has a number average molecular weight of 300 to 1500.

14. The composition of claim 1, wherein the alk(en)yl group has a number average molecular weight of 900-1000.

15. The composition of claim 1, wherein T has a number average molecular weight of 300 to 1500.

* * * * *